June 7, 1960   J. J. MURPHY ET AL   2,940,017
IN-FLIGHT TEST SYSTEM AND ASSEMBLY
Filed April 4, 1957   2 Sheets-Sheet 1

INVENTORS
JOHN J. MURPHY
SIGURD ZIEGLER
BY
ATTORNEY

June 7, 1960

J. J. MURPHY ET AL 2,940,017

IN-FLIGHT TEST SYSTEM AND ASSEMBLY

Filed April 4, 1957

INVENTORS
JOHN J. MURPHY
SIGURD ZIEGLER
BY

ATTORNEY

United States Patent Office 2,940,017
Patented June 7, 1960

2,940,017

IN-FLIGHT TEST SYSTEM AND ASSEMBLY

John J. Murphy, Solana Beach, and Sigurd Ziegler, San Diego, Calif., assignors to General Dynamics Corporation, San Diego, Calif., a corporation of Delaware Filed Apr. 4, 1957, Ser. No. 650,594

3 Claims. (Cl. 317—101)

This invention relates to in-flight test systems and assemblies and more particularly to a system of determining the operational characteristics of various equipments during aircraft flight.

Heretofore instrumentation was checked in aircraft by mounting various test instruments about the plane structure with suitable leads connected to the equipments being checked. Tests were first conducted on the ground for comparison with the in-flight characteristics later obtained. As modern aircraft developed in complexity more instrumentation was necessary. This required even more test equipment and provided for less available space for its installation. Testing then had to be done in stages and became very time-consuming both in the testing and in the installation and removal of the test equipment. Moreover, long lead lines from the instrumentation to the testing equipment was very undesirable.

The in-flight test system and assembly comprising the present invention utilizes the principles of miniaturization and compactness to provide for a minimum number of test assemblies for speedy installation and removal. Through the use of removable and interchangeable converter elements the instrumentation energy may be modified to any desired useful form for recording, telemetering or other data handling methods for later analyzation. The assemblies are of modular construction so as to be adaptable to fit available space within the aircraft.

It is therefore an object of this invention to provide for a novel in-flight test system and assembly.

Another object is the provision of an improved system for checking the in-flight operational characteristics of aircraft instrumentation.

Another object is the provision of improved test assemblies for monitoring in-flight instrumentation operation.

Another object is the provision of in-flight test assemblies of modular construction to permit installation in available spaces in aircraft.

Another object is the provision of in-flight test assemblies that may be quickly and easily installed and removed without interference with aircraft operation.

Another object is the provision of a data converter assembly for converting instrumentation signals to useful information for future analysis.

Another object is the provision of a data converter assembly for converting instrumentation signals into analytical data to determine instrumentation in-flight characteristics.

Another object is the provision of a data converter assembly having interchangeable components for converting any type of received instrumentation signal into any desired type of output signal indicative of its input for instrumentation characteristic analysis.

Another object is the provision of a data converter assembly having a multiple of channels, each adapted to convert preselected received instrumentation signals into proper form for data gathering and processing use.

Other objects and features of the present invention will be readily apparent to those skilled in the art from the following specification and appended drawings wherein is illustrated a preferred form of the invention, and in which.

Figure 1:
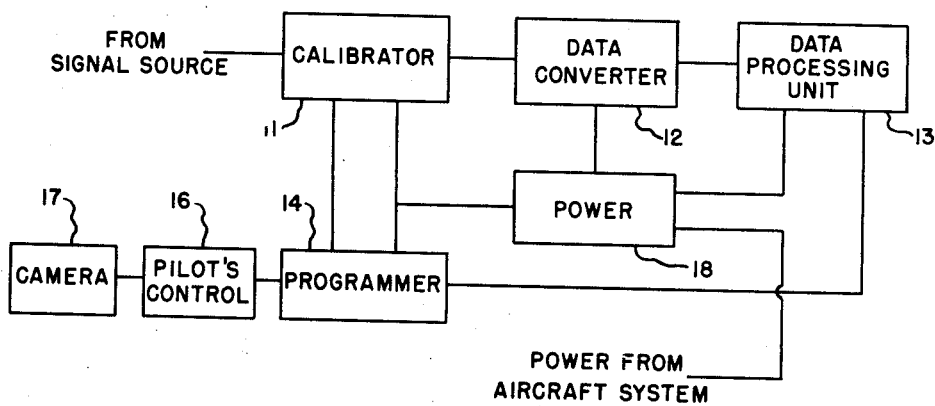
Figure 1 is an operational block diagram of the system.

Instrumentation in aircraft includes all equipment therein capable of receiving, sending or otherwise using electrical energy in its various forms. This includes navigational equipment, communication equipment, fire control equipment, cockpit instruments, electrical controls and other types of associated equipment. Most of the time spent in overhaul, maintenance, and repair of aircraft is in checking, testing and repairing this equipment. While many faults can be detected on the ground, other malfunctioning can only be detected by knowing the voltages, currents, waveforms and other electrical data at various points in the equipment during its operation and in its operational environment with other equipment also in operation. An analysis of the data thus collected will reveal a malfunctioning unit which may then be replaced and sent for repair. Such a monitoring system is shown in Figure 1, wherein electrical signals are extracted from selected pickup points in the system being monitored and conveyed to calibrator 11. The calibrator contains a double-pole, double-throw relay for each signal channel. In a normal non-energized condition, the signal passes through the calibrator 11 to the data converter box 12. Signals applied to the data converter box are modified by the converter units and applied to a data processing unit 13, which may be a recorder, read-out device or transmitting unit for example, depending upon the desired end function. During the calibration cycle, however, the channel relays are actuated, breaking the signal circuit, and allowing only a calibrating voltage to be applied to the data converter 12. This establishes a reference signal which is used for comparison purposes. The actuating time and cycling of the calibrator is governed by the programmer 14. The program mode is selected by the pilot on the pilot's control panel 16 installed in the cockpit. This panel permits selection of modes of operation during flight. This control panel also operates a camera 17 which records information from read-out devices connected to the system being checked. Power is supplied to the test system at 18 which comes from the aircraft power supply.

Figure 2:
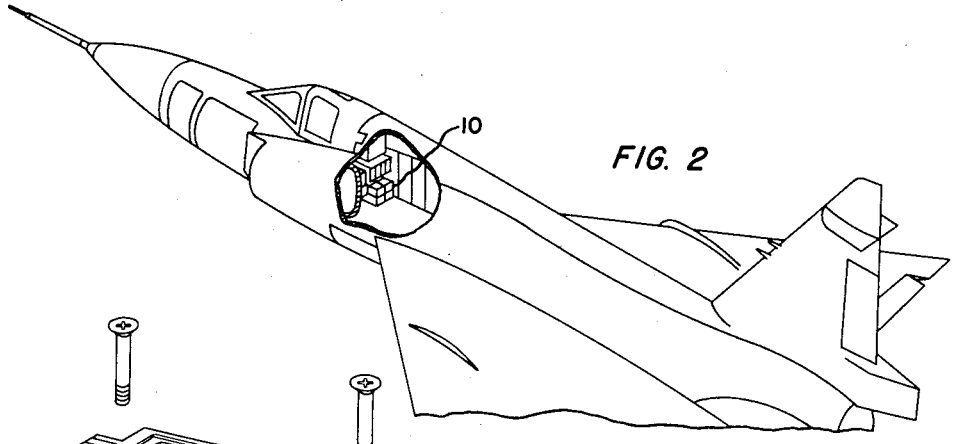
Figure 2 is an exemplary illustration of the system assembly in use.

While this system may be used in monitoring any of the electrical systems in the aircraft, its operation shall now be described in connection with a missile fire control system. It is to be understood however that this illustration is by way of description and not as a limitation. Figure 2 shows the test assembly as a composite unit 10 adapted to fit into space normally occupied by communications equipment which is not needed in this particular test and which may be readily and quickly removed. The power supply for the removed communications equipment has been found suitable for the test assembly and is used as power supply 18 in Figure 1. The pre-existing internal conducting cables for the removed equipment are used. The pilot's control panel for the removed equipment is also replaced with the pilot's control panel 16 which the pilot uses to actuate this test equipment.

Figure 3:
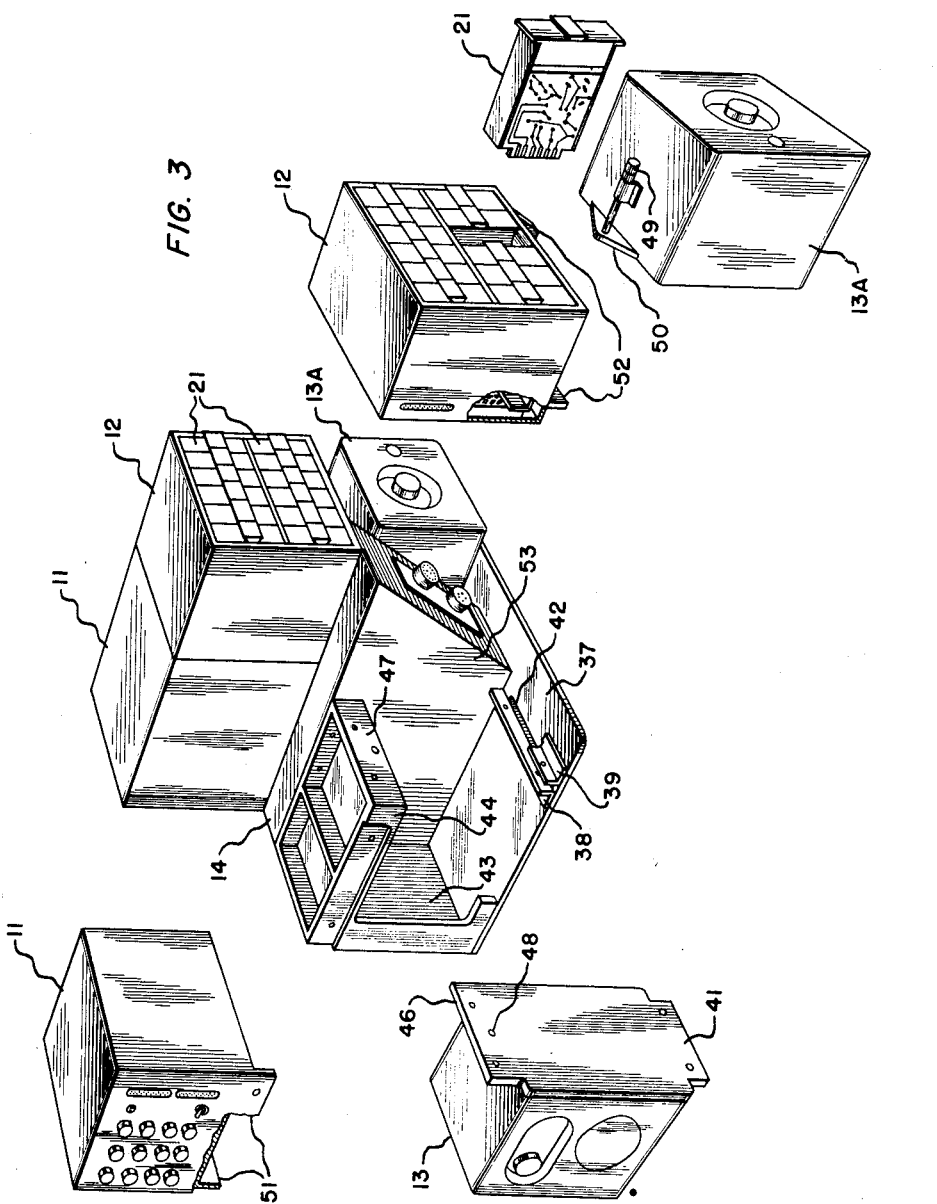
Figure 3 is an exploded perspective view to show the modular construction.

Figure 3 is an exploded perspective view. The calibration, data converter, data processing and programmer units are identified as 11, 12, 13 and 14, respectively, as in Figure 1. The data processing unit in this application consists of two 12-channel oscillographs 13 commercially available for recording purposes. Through the use of mirrors therein a record is made on light sensitive paper in housing 13A. Since these are of conventional design and form part of the invention only in combination with other components, a description of the details of their construction is not thought to be necessary as their purpose is well known to those skilled in the art.

The calibrator 11 is designed to inject known voltages into the data converters 12. Signals from the fire control system are conducted to the input terminals of the calibrator. Each signal input is connected to a relay which allows the signals to go directly through to the data converter units, or, if a calibrating voltage is applied, the data converter units are connected to the checking voltage source. The checking voltage is taken from standard or regulated power supplies and applied to a bleeder network where a stepping switch selects each voltage in sequence and introduces it into the data converter input. The normal setup of the calibrator requires only that the calibrator voltage selector switches agree in range with the data converters and recording galvanometers used. No attempt is made to duplicate exact values, since the main purpose is to determine the degree of drift, if any, over the recording run. Changes in resistance may be made on the board within the calibrator box if required.

The recording time and cycling of the calibrator is governed by the programmer 14. The pilot selects the program mode of "Lock On," "Automatic" or "Manual," which activates the programmer respectively when a "Lock On" signal, a continuous signal or a temporary signal is applied. The programmer then activates the camera 17, the recorder 13, including the paper rollers in housing 13A, and the calibrator 11 during the calibration cycle which is automatically performed preceding each mode of operation.

Signals from the calibrator and from the tested equipment are applied to the converter box 12 where they are modified by the converter units 21 for proper application to the recording oscillographs. As shown, there are two boxes, each providing space and electrical connections for twelve converter units 21. In external physical makeup all the data converter units are identical, and each may be inserted in any of the spaces provided by each box. Friction means such as leaf springs in the trackway prevent their accidental removal even under extreme conditions of vibration. Electrical connections are made through the back of each unit by simply inserting the unit into the box. Any number of input leads may be used as desired although in most instances only two input leads are required.

The converter units 21 modify the input signals to a form acceptable to specific types of galvanometers in the oscillographs. Therefore the signal to be measured and the galvanometer to be used determine the type of converter unit to be employed. For example, different types of converter units may contain:

(a) Matching networks for large signals.

(b) Summation networks for sequential indications on a single trace.

(c) A vacuum-tube voltmeter for A.C. signal conversion and isolation.

(d) A cathode follower for isolation and large signal conversion.

(e) A D.C. chopper-stabilized amplifier for low D.C. signals requiring a high degree of isolation.

(f) A voltage checker for expanding small voltages at high amplitude levels.

(g) A bridge balance system for use with strain gauge type end instruments.

Figure 4:
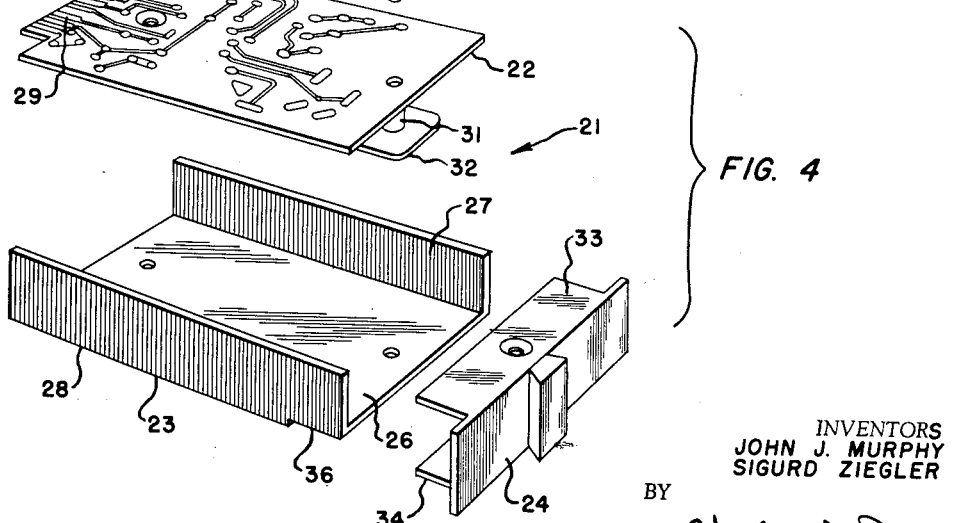
Figure 4 is an exploded perspective view of one of the data converter units.

While the above types of units were used in the recording of signals from fire control circuits, it should be understood that if other types of data processing are used, such as in telemetering for example, other types of converter unit circuits may be desirable. These are readily adapted as shown in Figure 4 which is an exploded view showing the assembly of a converter unit 21. This unit consists of an electrical circuit and component board 22, support 23 and connector 24. On the board is suitable printed circuitry and miniaturized components adapted to fit between the board 22 and the side member 26 and shielded by the top and bottom inturned flanges 27 and 28. The inner end of the circuit board has terminal circuit strips 29 extending to the end thereof to be received by conducting fingers forming terminals against the inner wall of the converter box 12. In order to properly provide spacing between side member 26 and circuit board 22, spacers 31 are provided. These also assure alignment of the terminal circuit strips 29 with the terminals within the converter box 12. On the opposite end of the spacers 31 is a heat sink 32 comprising a strip of heat absorbing material which is positioned adjacent the side wall 26 of the support member when assembled. The connector 24 covers the front end of the support and circuit board and has inturned flanges 33 and 34 extending thereover. The outer surface of side 26 is recessed at its outer end, designated by 36, to accommodate flange 34 of connector 24 and to provide a flush outer surface.

As previously noted the packaging of the assembly comprises modular construction. This permits the individual smaller packages to fit into several smaller available spaces and be connected with the necessary connections if a single larger space is not available. However, as shown in Figure 3 a rack has been designed to combine the several packages into a single assembly. This rack comprises a base 37 upon which is mounted supporting structure for securing the various assemblies. Spaced from the front edge are a pair of parallel rails 38 and 39 between which the lower lip 41 of recorder 13 may be inserted. An elongated slot 42 in the base receives the lip 41 when the recorder is positioned. Mounted at the rear of base 37 is an upstanding wall 43 at the top of which is mounted a forward extending frame 44. The back surface of the upper lip 46 of recorder 13 abuts against the outer front surface 47 where it is held in place by screws. Housing 13A, which contains the rolls of light sensitive paper, has screws engageable thereto at the top and bottom for fastening to the front surface 47 of frame 44 and the front rail 39, respectively. Aperture 48 in lip 46 permits passage therethrough of screw 49 to engage the front surface of frame 44. The programmer 14 is conveniently mounted in the center of the base 37 to provide additional support by attaching frame 44 thereto along its adjacent side. The top of the programmer is removable to provide access to its interior. The calibrator 11 rests on the frame and part of the programmer top. Downwardly extending flanges 51 from the rear and outer side of the calibrator overlap the back and outer edge of frame 44 and are bolted thereto. The back and inner edges of the bottom of the converter box 12 rest on the forward edge of frame 44 and a front portion of the programmer top. An L-shaped flange 52 integrally secured to the bottom of the converter box inwardly from the back and inner edges thereof abut the front surface 47 of frame 44 and the upper forward edge of side wall 53 of the programmer, respectively, and are secured thereto by means of bolts or screws. In order to permit removal of the recording equipment magazine 13A without the necessity of also removing the converter box 12, lip 50 of housing 13A is curbed downwardly from the center to the edges. The rear flange 52 has a cooperating curve extending upwardly toward the center from its ends. The rear flange is fastened to surface 47 at its outer extremities whereas lip 50 is fastened at its center by screw 49. Thus, the recording equipment magazine 13A may be removed without the necessity of removing the converter box 12 to load and empty film contained therein.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. A mounting rack for joining modular units containing electrical apparatus comprising a base, a rear upright wall and a frame on said wall parallel with said base, a first modular unit having flanges extending from the front wall at the top and bottom thereof, channel means on said base for receiving the bottom flange on said unit and means for connecting the top flange to the front surface of said frame when said unit is positioned between said base and said frame and in front of said rear wall, a container mounted on said base and extending along one side of said frame and attached therewith, a second modular unit having downwardly extending flanges along one side and rear wall for abutment against another side and rear of said frame when said second modular unit is mounted on said frame, a third modular unit having downwardly extending flanges from the bottom thereof spaced from and parallel to one side and rear bottom edge of said third unit, said flanges abutting the front of said frame and the front top wall portion of said container when said third unit is mounted on said frame and container in front of said second unit, and a fourth modular unit having retaining means on the top and bottom surfaces thereof for engagement with said channel means and said frame when mounted thereto in front of said first unit.

2. A data converter box containing a plurality of converter units with electrical connections thereto, each converter unit comprising a circuit board, a support and connector, said board having printed circuitry thereon, spacers mounted on one side of said board, said support comprising a side member with top and bottom inturned flanges, said spacers spacing said board from said side member to provide a uniform width to said unit, said connector providing an end closure and gripping means for removal of said unit, said board having means on the inner edge thereof for removably connecting said circuitry to said electrical connections.

3. A data converter box containing a plurality of converter units, each unit comprising a circuit board, a support and a connector, said support comprising a side member with inturned flanges, a spacer connecting said circuit board to said side member to provide a uniform width to said unit, said spacer having a heat sink positioned adjacent said side member, said connector providing an end closure and gripping means for removal of said unit, said closure having inturned flanges extending over the forward edge of said circuit board and the forward edge of said side member, said forward edge of said side member being recessed to receive said flange and provide a flush outer surface therewith.

References Cited in the file of this patent

UNITED STATES PATENTS

| | | |
|---|---|---|
| 2,077,160 | Wilson | Apr. 13, 1937 |
| 2,605,340 | Disney | July 29, 1952 |
| 2,636,929 | Sovthwick | Apr. 28, 1953 |
| 2,685,079 | Hoeppner | July 27, 1954 |
| 2,720,613 | Lustig | Oct. 11, 1955 |
| 2,796,559 | Feucht | June 18, 1957 |
| 2,864,977 | Witt | Dec. 16, 1958 |